(12) United States Patent
Kashiba et al.

(10) Patent No.: US 6,391,407 B1
(45) Date of Patent: *May 21, 2002

(54) OXYGEN ABSORBING MULTI-LAYER FILM AND OXYGEN ABSORBING PACKAGING CONTAINER

(75) Inventors: Takashi Kashiba; Ryoji Otaki; Yoshiki Ito, all of Kanagawa-ken (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,741

(22) Filed: Jun. 8, 1998

(30) Foreign Application Priority Data

Jun. 12, 1997 (JP) .............................................. 9-155160
Aug. 20, 1997 (JP) .............................................. 9-223886

(51) Int. Cl.[7] .......................... B32B 27/00; B32B 27/32
(52) U.S. Cl. .................... 428/35.7; 428/35.9; 428/36.4; 428/36.6; 428/36.7; 428/215; 428/220; 428/474.4; 428/483; 428/516; 428/518; 252/188.28
(58) Field of Search .............................. 428/35.7, 36.7, 428/36.91, 35.9, 215, 220, 521, 480, 474.4, 515, 516, 517, 519, 36.6, 463, 36.4; 252/188.28

(56) References Cited

U.S. PATENT DOCUMENTS 4,681,803 A * 4/1987 Liu ............................. 428/348
5,759,653 A * 6/1998 Collette et al. ............. 428/35.9
5,849,380 A * 12/1998 Kashiba et al. ............. 428/36.6
6,063,503 A * 5/2000 Hatakeyama et al. ....... 428/515

FOREIGN PATENT DOCUMENTS

EP 0 688 666 A 12/1995
EP 0 695 628 A 2/1996
EP 781649 7/1997

* cited by examiner

Primary Examiner—Rena L. Dye
(74) Attorney, Agent, or Firm—Frishauf, Holtz, Goodman, Langer & Chick, P.C.

(57) ABSTRACT

An oxygen absorbing multi-layer film which comprises a first outer surface comprising an uncolored oxygen permeating layer 11 comprising an oxygen permeating polyolefin which does not contain a pigment; a colored concealing, oxygen permeating layer 12 disposed under the uncolored oxygen permeating layer 11, the color concealing, oxygen permeating layer 11 comprising an oxygen permeating polyolefin and a pigment; a second outer surface disposed opposite to the first outer surface, the second outer surface comprising a gas barrier layer 3; and an oxygen absorbing layer 2 disposed between the colored concealing, oxygen permeating layer 12 and the gas barrier layer 3, the oxygen absorbing layer 2 being made of an oxygen absorbing resin composition comprising an iron-containing deoxidizing agent and an oxygen permeating polyolefin. The oxygen absorbing multi-layer film can be used as a packaging material and has desirable strength, heat resistance, heat-sealing properties, hot tack properties and appearance. An oxygen absorbing packaging container can be made of the oxygen absorbing multi-layer film.

23 Claims, 3 Drawing Sheets

FIG. 3 ved as such after a heat treatment such as a boiling
OXYGEN ABSORBING MULTI-LAYER FILM AND OXYGEN ABSORBING PACKAGING CONTAINER

BACKGROUND OF THE INVENTION (1) Field of the Invention

The present invention relates to an oxygen absorbing multi-layer film with excellence in strength, heat resistance, sealing properties and appearance, and a packaging container using this oxygen absorbing multi-layer film.

(2) Description of the Related Art

In recent years, as one packaging technique, there have been developed packaging containers which are made of a multi-layer material having an oxygen absorbing layer comprising an oxygen absorbing resin composition obtained by blending a thermoplastic resin with a deoxidizing agent and which intend to improve the gas barrier properties of the containers themselves and to impart an oxygen absorbing function thereto. The packaging containers having the oxygen absorbing function are each made of an oxygen absorbing multi-layer material constituted of an oxygen absorbing resin layer as an intermediate layer including the deoxidizing agent, a gas barrier outer layer of a package outside and an oxygen permeating inner layer of a package inside. These packaging containers are molded into bags, cups, trays, bottles and the like, and hence they have now been developed as such containers.

As the oxygen absorbing multi-layer materials, for example, in Japanese Patent Application Laid-open Nos. 72851/1990 and 90848/1992, there have been described oxygen absorbing multi-layer materials each having an oxygen absorbing layer as an intermediate layer obtained by dispersing an iron-including deoxidizing agent in a resin. Moreover, in Japanese Patent Application Laid-open No. 72941/1996, a technique has been suggested which intends to improve the oxygen absorption performance of the oxygen absorbing multi-layer material. Furthermore, in Japanese Patent Application Laid-open Nos. 132573/1996 and 40024/1997, improved techniques of the oxygen absorbing multi-layer materials have been described in which a polyolefin layer is interposed between a deoxidizing agent-including resin layer and a gas barrier layer.

As the deoxidizing agent which is blended in the oxygen absorbing layer of the oxygen absorbing multi-layer material, an iron-including deoxidizing agent is usually used. In the case that the oxygen absorbing layer comprising an oxygen absorbing resin composition blended with the iron-including deoxidizing agent is used as an oxygen absorbing multi-layer container for the preservation of a food or the like, the color of an iron powder blended in the oxygen absorbing layer and the color of an iron rust due to the absorption of oxygen in the container are visually observed at the time of the opening of the container, so that the appearance of a material such as the food to be preserved is impaired on occasion. As measures against this inconvenience, there is a technique in which a white pigment or a colored pigment is added to an oxygen permeating layer or to an oxygen absorbing layer, thereby concealing the iron powder contained in the oxygen absorbing layer.

In the technique of adding the pigment to the resin, however, the resin content in the oxygen absorbing layer containing the iron powder and the oxygen permeating layer containing the pigment is low, so that adhesive properties are weak, with the result that the impact resistance, tear strength and stick strength required for a packaging material inconveniently deteriorate. Additionally, in the case that such a packaging material is molded into packaging containers such as bags, heat-sealing properties and hot tack properties disadvantageously deteriorate.

SUMMARY OF THE INVENTION

An object of the present invention is to provide an oxygen absorbing multi-layer film having an oxygen absorbing layer comprising an oxygen absorbing resin composition containing a deoxidizing agent, which film is excellent in tear strength, stick strength, impact resistance, heat resistance, heat-sealing properties, hot tack properties and appearance.

Another object of the present invention is to provide an oxygen absorbing packaging container in which the above-mentioned oxygen absorbing multi-layer film is used.

The present inventors have intensively researched and investigated in order to solve the above-mentioned problems of oxygen absorbing multi-layer materials having deoxidizing agent-containing resin layers, and as a result, the above-mentioned problem which the conventional oxygen absorbing multi-layer materials have can be solved by arranging an oxygen permeating layer 1 comprising two layers of an uncolored layer 11 and a color concealing layer 12 inside an oxygen absorbing layer 2 comprising an oxygen absorbing resin composition obtained by blending an oxygen permeating thermoplastic resin with a deoxidizing agent, and then placing the uncolored layer 11 so as to be a surface layer. On the basis of this finding, the present invention has been completed.

The present invention is directed to an oxygen absorbing multi-layer film which comprises an oxygen permeating layer 1 comprising an oxygen permeating polyolefin which is one surface, a gas barrier layer 3 which is another surface, and an oxygen absorbing layer 2 sandwiched between these layers, and comprising an oxygen absorbing resin composition obtained by adding an iron-containing deoxidizing agent to an oxygen permeating polyolefin, the oxygen permeating layer 1 being constituted of two layers of an uncolored layer 11 and a color concealing layer 12, the colored layer 11 being a surface layer.

In addition, the present invention is also directed to an oxygen absorbing packaging container at least partially made of the above-mentioned oxygen absorbing multi-layer film in which the oxygen permeating layer 1 is used as an inner layer of the container.

The oxygen absorbing multi-layer film and the oxygen absorbing packaging container comprising this film according to the present invention are characterized in that the oxygen permeating layer 1 which is in contact with the oxygen absorbing layer 2 is constituted of two layers of the uncolored layer 11 and the color concealing layer 12, and the colored layer 11 is the surface layer, and so they are excellent in heat resistance, impact resistance, stick strength, tear strength, heat-sealing properties, hot tack properties and appearance. These features facilitate liquid filling, powder filling and automatic high-speed solid filling, and also enable a material packed in a packaging container to be preserved as such after a heat treatment such as a boiling treatment or a retort treatment, whereby further long-term preservation is made possible.

DETAILED DESCRIPTION OF THE PREFERRED EMBODIMENTS

Next, an oxygen absorbing multi-layer film and a packaging container of the present invention will be described in detail.

Figure 1:
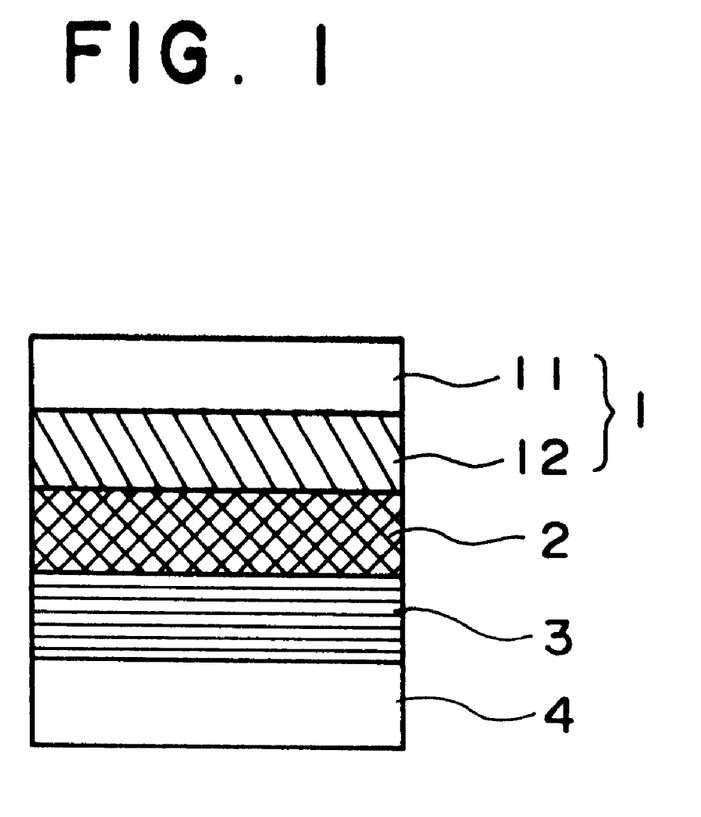
FIG. 1 is a sectional view showing one embodiment of an oxygen absorbing multi-layer film of the present invention.

A typical example of a layer constitution of the oxygen absorbing multi-layer film of the present invention (hereinafter abbreviated simply to "the multi-layer film" on occasion) is a layer constitution comprising an oxygen permeating layer 1 (which comprises an uncolored layer 11 and a color concealing layer 12), an oxygen absorbing layer 2, a gas barrier layer 3 and a protective layer 4, as shown in FIG. 1. On the basis of the supposition that the multi-layer film of the present invention is used to make a packaging container, the functions of the respective layers will be described. Incidentally, the protective layer 4 is not essential, and it may be laminated as needed.

The gas barrier layer 3 plays the role of blocking the invasion of oxygen from the outside, and the oxygen absorbing layer 2 mainly plays the role of absorbing oxygen in the container, but it also plays another role of absorbing invasive oxygen which has not completely been blocked by the gas barrier layer 3.

The oxygen permeating layer 1 comprising the uncolored layer 11 and the color concealing layer 12 plays the role of an isolated layer for preventing the oxygen absorbing layer 2 from directly coming in contact with a material received in the container, and another role of allowing oxygen in the container to promptly and efficiently permeate through the oxygen permeating layer 1 itself so that the oxygen absorbing layer may sufficiently exert its oxygen absorption function. The oxygen permeability of the oxygen permeating layer is preferably 100 cc/m$^2$·atm·day (23° C., 100% RH) or more, more preferably 500 cc/m$^2$·atm·day (23° C., 100% RH) or more, irrespective of the number and the thickness of the layers.

The color concealing layer 12 of the oxygen permeating layer 1 plays the role of concealing a deoxidizing agent blended in the oxygen absorbing layer 2 from the side of the multi-layer film surface. In addition, the uncolored layer 11 is the surface layer of the multi-layer film, and it plays the role of a heat-sealing surface at a time when the container is sealed. The protective layer 4 plays the role of protecting the gas barrier layer 3 from pinholes, scratches and the like.

Figure 2:
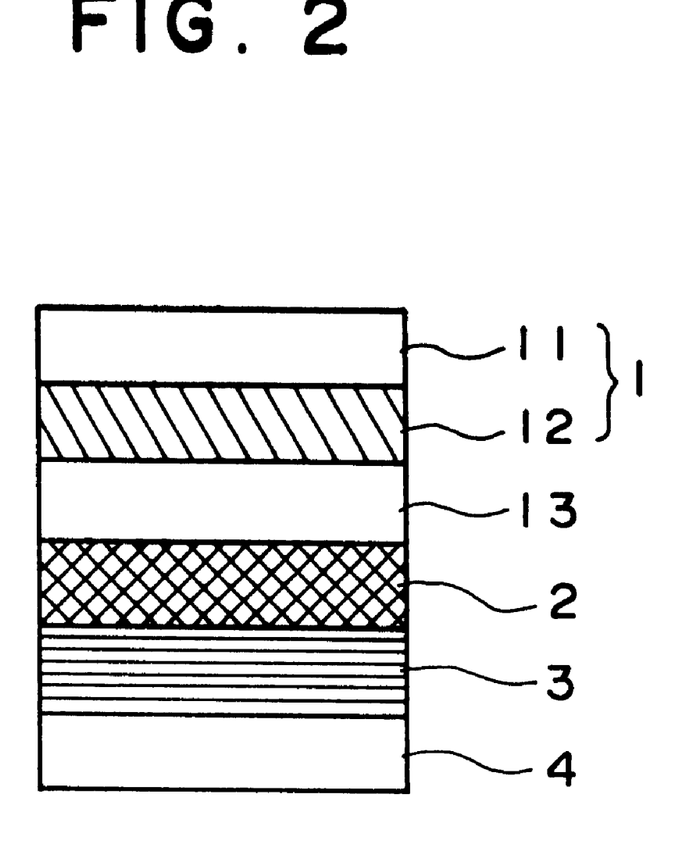
FIG. 2 is a sectional view showing another embodiment of an oxygen absorbing multi-layer film of the present invention.
Figure 3:
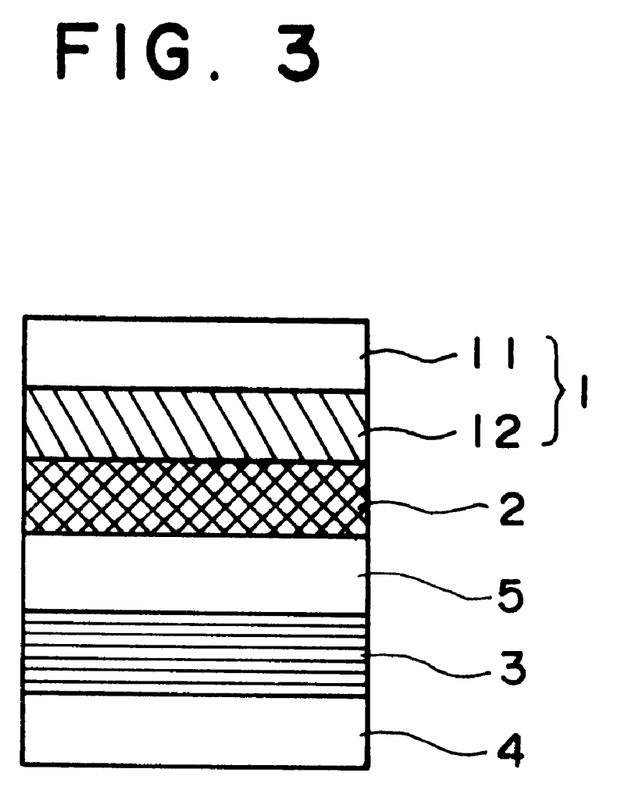
FIG. 3 is a sectional view showing still another embodiment of an oxygen absorbing multi-layer film of the present invention.

The multi-layer film of the present invention can exert the effects by the constitution of the oxygen permeating layer 1 (which comprises the uncolored layer 11 and the color concealing layer 12), the oxygen absorbing layer 2 and the gas barrier layer 3, but this constitution is not restrictive, and a further layer can be added between any layers, if necessary. A typical example, as shown in FIG. 2, comprises a layer constitution constituted of an oxygen permeating layer 1 (the uncolored layer 11 and the color concealing layer 12), a resin layer 13, the oxygen absorbing layer 2, the gas barrier layer 3 and the protective layer 4, by interposing a resin layer 13 comprising the oxygen permeating polyolefin between the color concealing layer 12 and the oxygen absorbing layer 2. In addition, as shown in FIG. 3, there is a layer constitution further containing an adhesive layer 5, i.e., a layer constitution comprising the oxygen permeating layer 1 constituted of the two layers of the uncolored layer 11 and the color concealing layer 12, the oxygen absorbing layer 2, the adhesive layer 5, the gas barrier layer 3, and the protective layer 4.

As a material of the oxygen permeating layer 1, a polyolefin is used, and typical examples of the polyolefin include polyethylenes such as low-density polyethylenes, straight-chain low-density polyethylenes, medium-density polyethylenes, high-density polyethylenes and metallocene polyethylenes (and copolymers), polypropylenes such as polypropylene, propylene-ethylene random copolymers, propylene-ethylene block copolymers and metallocene polypropylenes (and copolymers), polyolefins such as polymethylpentene (and copolymers), elastomers such as ethylene-propylene rubbers, ethylene-vinyl acetate copolymers and mixtures thereof. In the case where the oxygen absorbing packaging container is subjected to a retort treatment or a high retort treatment, the polyolefin to be used in the oxygen permeating layer 1 has preferably a melting point of 135° C. or higher.

By the term "metallocene polyethylene" as mentioned herein is meant a polyethylene produced by a gas-phase method or a solution method in the presence of a metallocene catalyst which has a molecular structure wherein a transition metal is positioned between unsaturated cyclic compounds, and which is a homogeneous compound being soluble in a polymerization medium.

With regard to the metallocene polyethylene, its molecular weight distribution is relatively monodisperse, and high-molecular weight components and low-molecular weight components are small. Therefore, as compared with a conventional polyethylene obtained in the presence of a Ziegler catalyst, the metallocene polyethylene is more excellent in physical properties such as impact resistance, heat-sealing properties, hot tack properties, impurities-sealing properties and oxygen permeability as well as odorless properties. Accordingly, owing to these features, the metallocene polyethylene is desirable as a material for the oxygen permeating layer 1 or the oxygen absorbing layer 2.

The oxygen permeating layer 1 comprises two layers of the uncolored layer 11, the color concealing layer 12, and the uncolored layer 11 becomes a surface layer of the oxygen absorbing multi-layer film and a heat-sealing layer of the oxygen absorbing packaging container. Furthermore, the color concealing layer 12 is placed at a position between the uncolored layer 11 and the oxygen absorbing layer 2 in the oxygen absorbing multi-layer film, and when being used as the packaging container for a food, the color concealing layer 12 can conceal a deoxidizing agent blended in the oxygen absorbing layer.

The uncolored layer 11 comprises a polyolefin which does not contain an inorganic material such as a pigment. In the oxygen absorbing multi-layer film of the present invention, the uncolored layer 11 is formed as the surface layer, whereby the heat-sealing properties and the hot tack properties of the molded container can be improved. Even if liquid or powder in the container adheres to the heat-sealing layer, the uncolored layer 11 is still excellent in sealing properties. These features facilitate liquid filling, powder filling and automatic high-speed solid filling. Furthermore, even if a boil treatment or a retort treatment is carried out after the filling, the oxygen absorbing packaging container can maintain its sealing properties, because the uncolored layer 11 is excellent in sealing properties and heat properties. In addition, the uncolored layer 11 has an effect of improving the impact resistance, the tear strength and the stick strength of the oxygen absorbing multi-layer film and the packaging container which are deteriorated by adding the deoxidizing agent and the pigment to the oxygen absorbing layer 2 and the color concealing layer 12.

A resin which can be used to form the uncolored layer 11 is the same polyolefin as the resin for the oxygen permeating layer 1, but the kind of polyolefin can suitably be selected in consideration of properties of a material to be filled, a filling method, heat treatment conditions and a usage. Particularly in the case that an automatic filling and a boil treatment of the material to be preserved are carried out, there can preferably be used polyethylenes such as metallocene polyethylenes (and copolymers), straight-chain low-density polyethylenes, medium-density polyethylenes and high-density polyethylenes, a mixture of these polyethylenes and elastomers such as ethylene-propylene rubber, and a mixture of these polyethylenes and copolymer of ethylene and vinyl acetate.

Furthermore, in the case that the filled material is subjected to a retort treatment or a high retort treatment, high-density polyethylenes and polypropylenes such as polypropylenes, propylene-ethylene random copolymers, propylene-ethylene block copolymers can be used, and above all, polypropylenes, a mixture of polypropylenes and elastomers such as ethylene-propylene rubbers, and mixtures of polypropylenes and metallocene polyethylenes (and copolymers) can preferably be used.

In the case of using multi-layers film for lids of the containers, an easy peel resin can be used as uncolored layer 11. To the uncolored layer 11, additives such as a slip agent, an antistatic agent, an antioxidant other than a pigment can be added in an amount within such a range as not to impair the function of the oxygen absorbing multi-layer film.

The thickness of the uncolored layer 11 is preferably in the range of 10 to 100 $\mu$m, more preferably 20 to 80 $\mu$m. If the thickness of the uncolored layer 11 is less than 10 $\mu$m, film functions such as the strength and heat-sealing properties are not sufficient, and if it is more than 100 $\mu$m, the oxygen permeability deteriorates, so that the oxygen absorbing performance of the multi-layer film deteriorates.

The color concealing layer 12 comprises a polyolefin colored by adding a pigment thereto, and as a resin for the color concealing layer 12, the above-mentioned polyolefin can be used. As the pigment, there can be used pigments having white, black and other colors, and typical examples of the pigments include inorganic materials such as titanium oxide and calcium carbonate, and above all, titanium oxide is preferable in view of an appearance of a food or the like to be preserved. The pigment is used in an amount enough to conceal the oxygen absorbing layer 2, and the typical amount of the pigment to be added is preferably in the range of 2 to 50% by weight based on the polyolefin constituting the color concealing layer 12. If the amount of the pigment to be added is less than 2% by weight, the concealment of the oxygen absorbing layer is insufficient, and if it is more than 50% by weight, the adhesive properties of the color concealing layer 12 to the uncolored layer 11 are poor.

Furthermore, the thickness of the color concealing layer 12 is preferably in the range of 10 to 100 $\mu$m, more preferably 20 to 80 $\mu$m. If the thickness of the color concealing layer 12 is less than 10 $\mu$m, concealing properties are poor, and if it is more than 100 $\mu$m, the oxygen permeability deteriorates, so that the oxygen absorbing performance of the multi-layer film is decreased. The formation of the color concealing layer 12 permits the concealment of the iron powder and the additives blended in the oxygen absorbing layer 2 as well as rust produced by the oxidation of the iron powder, whereby the oxygen absorbing multi-layer film having an excellent appearance can be obtained.

In the case that the coloring pigment for the sake of the concealment of the deoxidizing agent is added to the color concealing layer 12, the amount of the polyolefin in the concealing layer 12 decreases, so that the heat-sealing properties, the hot tack properties, the impact resistance and the strength of the packaging container are impaired on occasion.

The present inventors have solved this problem by forming the uncolored layer 11 comprising the polyolefin in which any inorganic material such as the pigment is not added to the film surface, so that they have succeeded in satisfactorily maintaining the strength and the impact resistance of the oxygen absorbing multi-layer film as well as the heat-sealing properties and the hot tack properties of the obtained packaging container.

Furthermore, there may be formed, between the color concealing layer 12 and the oxygen absorbing layer 2, a resin layer 13 comprising a polyolefin containing no pigment.

The resin for a resin layer 13 may be the same type polyolefin as in the uncolored layer 11. The formation of the resin layer 13 between the color concealing layer 12 and the oxygen absorbing layer 2 can prevent the deterioration of interlaminar strength which is caused by the decrease in the resin amount owing to the inclusion of the pigment in the color concealing layer 11 and an oxygen absorbent in the oxygen absorbing layer 2. The thickness of the resin layer 13 is in the range of 5 to 100 $\mu$m, preferably 10 to 80 $\mu$m.

With regard to a combination of the resins which can be used to form the color concealing layer 12, the resin layer 13, and the oxygen absorbing layer 2, it is preferable to use the same resin or different kinds of resins. In case of different resins, they are compatible with each other and which can thermally fuse each other.

The oxygen absorbing layer 2 is made of an oxygen absorbing resin composition comprising a polyolefin to which the deoxidizing agent is added. The deoxidizing agent which can be blended is not always limited, and any deoxidizing agent can be used, so long as it can bring about an oxygen absorbing reaction and can be dispersed in the polyolefin. Nevertheless, an iron-containing deoxidizing agent in which metallic iron is a main agent of the oxygen absorbing reaction is preferable, and an agent containing metallic iron and a metal halide is particularly preferable. Furthermore, an iron powder on which a metal halide is deposited is most preferable, because of having a high oxygen absorbing activity.

In the iron-containing deoxidizing agent, the purity and the like of metallic iron which is the main component are not particularly limited, so long as metallic iron can bring about the oxygen absorbing reaction, and for example, metallic iron whose surface is partially already oxidized and metallic iron containing a metal other than iron are also usable.

Moreover, metallic iron preferably has a large surface area, and hence powdery metallic iron or particulate metallic iron is preferable. Examples of usable metallic iron include iron powders such as a reduced iron powder, a sprayed iron powder and an electrolytic iron, and pulverized and ground materials of a cast iron, a steel and the like. The iron powder is preferably minute in order to permit the formation of the thin oxygen absorbing layer or multi-layer film, and the average particle diameter of the iron powder is preferably 200 $\mu$m or less, more preferably in the range of 1 to 100 $\mu$m.

The metal halide is a catalyst which acts on the oxygen absorbing reaction of metallic iron as the main component. Examples of the preferably usable metal halide include chlorides, bromides and iodides of alkali metals and alkaline earth metals, and preferably, chlorides of lithium, sodium, potassium, magnesium, calcium and barium are used. The amount of the metal halide to be blended is preferably in the range of 0.1 to 20 parts by weight, more preferably 0.1 to 5 parts by weight with respect to 100 parts by weight of metallic iron. If the amount of the metal halide is less than 0.1 part by weight, the metal halide cannot adsorb water enough for the iron powder to absorb oxygen, and if it is more than 20 parts by weight, the metal halide excessively adsorbs water to disturb the oxygen absorption by the iron powder. In particular, in the case that the metal halide is deposited on the surface of the iron powder, the amount of the metal halide to be blended can be decreased.

The metal halide is blended in the resin together with metallic iron as a component constituting the deoxidizing agent composition. In order to prevent the metal halide from easily separating in the resin, it is preferable that prior to adding the metal halide to the resin, the metal halide is mixed with metallic iron so as to be deposited thereon. For example, there can be employed a method of mixing the metal halide powder with the iron powder by the use of a ball mill or a speed mill, a method of filling the metal halide into recesses on the surface of the iron powder, a method of depositing the metal halide on the surface of the iron powder by the use of a binder, or a method of mixing an aqueous metal halide solution with the iron powder, and then drying the mixture to deposit the metal halide on the surface of the iron powder. Above all, particularly preferable is the method which comprises mixing the aqueous metal halide solution with the iron powder, and then drying the mixture to deposit the metal halide on the surface of the iron powder.

Typical examples of the polyolefin which can be used to form the oxygen absorbing layer 2 include polyethylenes such as low-density polyethylenes, straight-chain low-density polyethylenes, medium-density polyethylenes, high-density polyethylenes and metallocene polyethylenes (and copolymers), polypropylenes such as polypropylene, propylene-ethylene random copolymers, propylene-ethylene block copolymers and metallocene polypropylenes (and copolymers), polyolefins such as polymethylpentene (and copolymers), elastomers such as ethylene-propylene rubbers, ethylene-vinyl acetate copolymers and mixtures thereof. In the case where the oxygen absorbing packaging container is subjected to a retort treatment or a high retort treatment, the polyolefin to be used in the oxygen absorbing layer 2 has preferably a melting point of 135° C. or higher. With regard to a combination of the resins which can be used to form the oxygen permeating layer 1 and the oxygen absorbing layer 2, it is preferable to select the same resin or different kinds of resins which are compatible with each other and which can thermally fuse each other.

In the present invention, it is preferable to add an alkaline earth metal oxide to the oxygen absorbing resin composition constituting the oxygen absorbing layer 2. Examples of the alkaline earth metal oxide include magnesium oxide, calcium oxide, strontium oxide and barium oxide, and from the viewpoints of easy availability, reactivity and the like, magnesium oxide and calcium oxide are particularly preferable. The average particle size of the alkaline earth metal oxide is preferably in the range of 1 to 200 $\mu$m, more preferably in the range of 1 to 50 $\mu$m. The particle size of the alkaline earth metal oxide is preferably equal to or less than that of the deoxidizing agent composition.

By adding the above-mentioned alkaline earth metal oxide to the oxygen absorbing layer 2, there can be prevented the generation of bubbles caused by water during the manufacture of the oxygen absorbing multi-layer film, so that an oxygen absorbing multi-layer film having an excellent appearance can be obtained.

Furthermore, in the present invention, an adsorbable deodorant may be added to the oxygen absorbing resin composition in order to retain the flavor of the contents to be preserved. The oxygen absorbing resin composition or the multi-layer film slightly emits a resin odor on occasion, but the addition of the adsorbable deodorant can solve this problem. It is also possible to add an adsorbent to the color concealing layer 12.

The larger the specific surface area of the adsorbent is, the higher the adsorbability of the adsorbent is, but the specific surface area of the adsorbent is preferably 100 $m^2$/g or more (a BET method), more preferably 500 $m^2$/g or more.

The preferable adsorbent can adsorb 2% or more of water during the preservation at 23° C. at an RH of 60% or less, and typical examples of the adsorbent include an activated carbon, a zeolite and an activated alumina, among them, the activated carbon is most preferable, because of its high adsorptive function of bad taste components and bad odorous components.

The activated carbon made of a raw material such as coconut shells, a wood or a coal can be used. No particular restriction is put on the preparation method of the activated carbon, but the activated carbon obtained by a method such as a water vapor activation method or a zinc chloride activation method can preferably be used. The average particle diameter of the activated carbon is preferably in the range of 1 to 200 $\mu$m, more preferably 1 to 50 $\mu$m. The particle diameter of the activated carbon is suitably equal to or less than that of the oxygen absorbing composition. The activated carbon can be classified into a dry carbon and a wet carbon in which water is previously contained, but in the present invention, the dry carbon having a water content of 10% [JIS (Japanese Industrial Standard) K1470] or less is particularly preferable. When the water content of the activated carbon is high, a larger amount of the alkaline earth metal oxide is required to remove the water content from the activated carbon, and for this reason, the active carbon containing much water is not preferable. The adsorbing performance of the activated carbon can usually be estimated by a methylene blue decoloring power (JIS K1470) and a caramel decoloring power (JIS K1470), but in order to efficiently adsorb the odor components, it is preferable that both of the methylene blue decoloring power and the caramel decoloring power are simultaneously high. Concretely, the activated carbon having a methylene blue decoloring power of 150 ml/g or more and a caramel decoloring power of 90% or more is preferable.

The deoxidizing agent (which comprises the main component and the catalyst) content in the oxygen absorbing resin composition is usually in the range of 2 to 93% by weight, preferably 5 to 70% by weight, based on the weight of the oxygen absorbing resin composition. If the deoxidizing agent content is less than 2% by weight, a sufficient oxygen absorbing performance cannot be obtained, and if it is more than 93% by weight, the mechanical strength and the moldability of the resin composition are poor.

The content of the adsorbent in the oxygen absorbing resin composition is preferably in the range of 0.1 to 5% by weight. If the content of the adsorbent is less than 0.1% by weight, sufficient aroma holding properties cannot be obtained, and if it is more than 5% by weight, the mechanical strength and the moldability of the resin composition are poor.

Moreover, the content of the alkaline earth metal oxide in the oxygen absorbing resin composition is preferably in the range of 0.1 to 5% by weight. If the amount of the alkaline earth metal oxide is less than 0.1% by weight, a sufficient water removal effect cannot be obtained, and if it is more than 5% by weight, even water which is required for the oxygen absorbing reaction is adsorbed, so that the oxygen absorbing reaction of the oxygen absorbing composition is inconveniently hindered.

The thickness of the oxygen absorbing layer 2 is preferably in the range of 10 to 200 μm. If the thickness of the oxygen absorbing layer 2 is less than 10 μm, the absorbing performance of the multi-layer film is insufficient, and if it is more than 200 μm, the flexibility of the multi-layer film deteriorates.

The gas barrier layer 3 is a layer for blocking the invasion of oxygen from the outside, and it is made of a gas barrier material having a low oxygen gas permeability. Examples of the material for the gas barrier layer to be used alone in combination include a metallic foil such as aluminum foil; gas barrier resin films such as ethylene-vinyl alcohol copolymers, polyvinylidene chloride and nylon MXD6; ceramic vapor-deposited films obtained by vapor-depositing aluminum oxide, silicon oxide and the like on resin films such as polyesters and nylons; metal vapor-deposited films obtained by vapor-depositing metals such as aluminum on the resin film, and coated films coated with gas barrier resins such as polyvinylidene chloride.

The oxygen permeability of the gas barrier layer is preferably less than 100 cc/m$^2$·day·atm (23° C., RH=100%), more preferably less than 50 cc/m$^2$·day·atm (23° C., RH=100%), irrespective of the number and the thickness of the layers.

Furthermore, it is preferable to laminate the protective layer 4 comprising an impact-resistant resin on the outer surface of the gas barrier. The protective layer 4 is formed to protect the gas barrier layer 3 from damages such as pinholes and scratches. The protective layer 4 can enhance the heat-sealing properties in the case that the packaging container is made of the oxygen absorbing multi-layer film, and therefore, as a material for the protective layer 4, a thermoplastic resin having a melting point which is 10° C. or more higher than the melting point of the uncolored layer 11 is preferably used. By making a difference in melting points among the film layers constituting the oxygen absorbing multi-layer film, the uncolored layer 11 can favorably be heat-sealed when heated from the side of the protective layer 4.

Typical examples of a resin for the protective layer 4 include a polyolefin such as high-density polyethylenes, polypropylenes, propylene-ethylene random copolymers and propylene-ethylene block copolymers, polyamide resins such as nylon 6 and nylon 6,6, and polyester resins such as polyethylene terephthalate and polyethylene naphthalate, and they can be used singly or in a combination thereof. Above all, a single resin comprising the polyamide resin or a combination of the polyamide resin and the polyester resin is preferably used, because they can improve the impact resistance of the film.

According to the present invention, there can be provided the oxygen absorbing multi-layer film which comprises the oxygen permeating layer 1 comprising the uncolored layer 11 as the surface layer and the color concealing layer 12, the oxygen absorbing layer 2 and the gas barrier layer 3 and which is excellent not only in the appearance, the strength and impact resistance, but also in the heat sealing properties and hot tack properties when made into a packaging container. It is preferable to allow an adhesive layer 5 comprising either or both of an adhesive and an adhesive resin to intervene between the oxygen absorbing layer 2 and the gas barrier layer 3 to assure adhesion therebetween.

By forming the adhesive layer 5 of the adhesive resin, roughness by the iron particles on the surface of the resin layer containing the deoxidizing agent can be smoothed, the surface of the oxygen absorbing layer 2, thereby the adhesive strength between the oxygen absorbing layer 2 and the gas barrier layer 3 can be increased. Typical examples of the adhesive resin include polyethylenes such as low-density polyethylenes, medium-density polyethylenes, straight-chain low-density polyethylenes and high-density polyethylenes, polypropylenes such as polypropylene, propylene-ethylene random copolymers and propylene-ethylene block copolymers, modified polyethylenes and polypropylenes, elastomers such as ethylene-propylene rubbers, ethylene-vinyl acetate copolymers, and mixtures thereof. As the adhesive resin, it is preferable to select the same resin as the oxygen absorbing layer 2 or different kinds of resins which are compatible with each other and which can thermally fuse each other.

The adhesive layer 5 comprising the adhesive resin is formed in the range of 7 to 80 μm, preferably 15 to 60 μm in thickness.

The oxygen absorbing layer 2 and the gas barrier layer 3 may be laminated via the adhesive layer 5 of the adhesive. Examples of the adhesive include isocyanate adhesives, urethane adhesives, polyester adhesives and mixtures thereof. Incidentally, as the adhesive layer 5, a combination of the above-mentioned adhesive resin and the adhesive may be used.

The preparation of the oxygen absorbing multi-layer film according to the present invention can be optimally put into practice by adopting any of various well known lamination methods alone or in appropriate combination in accordance with the multi-layer film constitution, and the types and properties of the materials of respective layers.

For example, the color concealing layer 12 is laminated on the uncolored layer 11 as the base film by extrusion, and the oxygen absorbing layer 2 containing the deoxidizing agent is then laminated on the color concealing layer 12 by the extrusion. At this time, the surface of the oxygen absorbing layer 2 is cooled by a smoothing roll. Furthermore, on the surface of the oxygen absorbing layer 2, the gas barrier layer 3 is laminated by the use of either or both of the adhesive and the adhesive resin by dry lamination or the extrusion, thereby preparing the oxygen absorbing multi-layer film. The protective layer 4 can be laminated on the gas barrier layer 3 by a known lamination method such as dry lamination or extrusion lamination.

Alternatively, the oxygen absorbing layer 2 containing the deoxidizing agent is laminated on the adhesive layer 5 as the base film comprising the thermoplastic resin by extrusion, and on the oxygen absorbing layer 2, the color concealing layer 12 and the uncolored layer 11 are successively laminated by the extrusion. Furthermore, on the adhesive layer 5, the gas barrier layer 3 is laminated by the use of either or both of the adhesive and the adhesive resin by dry lamination or the extrusion, thereby preparing the oxygen absorbing multi-layer film. In addition, on the gas barrier layer 3, the protective layer 4 may be laminated by a known lamination method. On the multi-layer film obtained by previously laminating the adhesive layer 5 and the gas barrier layer 3 (and the protective layer 4), the oxygen absorbing layer 2 et seq. can be laminated.

The above-mentioned process of separately laminating the color concealing layer 12 and the uncolored layer 11 by the extrusion lamination can be replaced with a process of laminating the color concealing layer 12 and the uncolored layer 11 by co-extrusion lamination, or a process of extruding the color concealing layer 12 between the uncolored layer 11 and the oxygen absorbing layer 2 to accomplish sandwich lamination. In place of the extrusion lamination, dry lamination can also be employed. Furthermore, on the three-layer film as the base film which comprises the uncolored layer 11, the color concealing layer 12 and the pigment-free resin layer 13, the oxygen absorbing layer 2 containing the deoxidizing agent may be laminated by the extrusion lamination, and the gas barrier layer 3 and the protective layer 4 may then be laminated by dry lamination or extrusion lamination. In this case, in consideration of the adhesive properties of the layer 13 and the oxygen absorbing layer 2, the layer 13 is preferably a two-kind 3-layer film which can be made of the same resin as the uncolored layer 11 not containing any pigment and the like.

When the oxygen absorbing multi-layer film of the present invention is used for the whole of a packaging container or for a part of the packaging container made of a gas barrier material, a small amount of oxygen invaded from the outside of the container and oxygen in the container can be absorbed to prevent the quality of the contents being preserved in the container from changing by oxygen. That is to say, the present invention is directed to a packaging container in which the above-mentioned oxygen absorbing multi-layer film is used as at least a part of the wall surface of the container so that the uncolored layer 11 may be arranged inside the container.

When the oxygen absorbing multi-layer film is molded into a packaging container such as a bag or a tube and then used, or when the oxygen absorbing multi-layer film is used as a member such as a lid or a top seal film of the container, an oxygen absorbing function can be imparted to the packaging container. At the time of the molding of the container, the uncolored layer 11 is used as a heat seal surface. Furthermore, the bag member can be used for two side films and one bottom film to make a standing pouch.

The packaging containers made of the oxygen absorbing multi-layer film of the present invention can be used for the packing of articles which should preferably be preserved in an oxygen-free state in order to maintain their quality. For example, the packaging containers of the present invention can be applied to foods and drugs, e.g., liquid drinks such as juices, liquors, coffees, teas, jelly drinks and health drinks, seasonings such as seasoning liquids, sauces, soy sauces, dressings, liquid stocks, mayonnaises, fermented soybean pastes and ground spices, pasty cakes such as creams and chocolates, liquid processed foods such as liquid soups, boiled foods, pickles and stews, unboiled noodles and boiled noodles such as buckwheat noodles, white noodles and Chinese noodles, uncooked rices such as polished rice, wetted rice and unwashed rice, boiled rices, cooked rice products such as boiled rices mixed with fish and vegetables, powder stocks such as powder soups and stock essences, solutions and emulsions of chemicals such as industrial materials, agricultural chemicals and insecticides, liquid and pasty drugs, face lotions, toilet creams, milky lotions, hair liquids, hair dyes, shampoos, and liquid and powder detergents.

The packaging container made of the oxygen absorbing multi-layer film according to the present invention can be filled with a food or a drug, sealed up, and then subjected to a heat treatment at a temperature of 85° C. to 135° C., whereby the food or the drug can be maintained with high quality for a long time. That is to say, the packaging container is excellent in heat resistance, sealing properties and impact resistance, and its oxygen absorbing performance does not deteriorate, and so it can withstand the heat treatment in the above-mentioned temperature range. Thus, the packaging container can promptly remove oxygen in the container therefrom and can efficiently block oxygen outside the container, whereby it can exert a remarkable effect for a quality maintenance of the food or the drug. In this connection, no particular restriction is put on a heating time for sterilization, but for the effective sterilization, the heating time is preferably in the range of 4 to 90 minutes.

Next, the present invention will be described in more detail in accordance with examples. Incidentally, the scope of the present invention should not be limited to these examples at all.

PREPARATION EXAMPLE 1

In a vacuum mixing drying machine equipped with a heating jacket was placed 100 kg of a reducing iron powder having an average particle diameter of 30 $\mu$m, and 5 kg of a 50% by weight aqueous calcium chloride solution was sprayed thereinto, while the powder was heated at 140° C. under a reduced pressure of 10 mmHg. Afterward, the powder was dried at 140° C. for 1 hour to obtain a deoxidizing agent in which calcium chloride was deposited on the iron powder. This deoxidizing agent was screened to remove coarse particles of 80 $\mu$m or more. Next, a straight-chain low-density polyethylene having a melt flow rate of 10.0 g/100 min (190° C., 2.16 kgf; JIS K6760), the above-mentioned deoxidizing agent and calcium oxide having an average particle diameter of 20 $\mu$m were kneaded in a weight ratio of 59:40:1 by the use of an extruding machine comprising a 45 mm$\phi$ one direction rotatable twin-screw extruder equipped with vents and a constant feeder, and the kneaded material was then extruded through a strand die. At this extrusion, a screen of 80 mesh was used in a breaker plate portion. The thus extruded oxygen absorbing resin composition was water-cooled and then ground, thereby obtaining a master batch A including 40% by weight of the deoxidizing agent.

EXAMPLE 1

By the use of a tandem extrusion laminator having two pairs of extruders comprising a single screw extruder, a T-die and a cooling roll, on the side of a low-density polyethylene of a laminated film having a thickness of 45 $\mu$m and comprising the low-density polyethylene as an adhesive layer 5 having a thickness of 30 $\mu$m and a nylon MXD6 stretched film (trade name Nylon Superneal, made by Mitsubishi Chemical Industries, Ltd.) as a gas barrier layer 3 having a thickness of 15 $\mu$m, an oxygen absorbing layer 2 comprising a master batch A was extruded from the first extruder and laminated. On this oxygen absorbing layer 2, a color concealing layer 12 having a thickness of 20 $\mu$m and comprising a metallocene polyethylene containing 10% by weight of titanium oxide and having a melting point of 87° C. (trade name Exact 3010C, made by and Exon Co., Ltd.) and an uncolored layer 11 having a thickness of 20 $\mu$m and comprising a metallocene polyethylene not containing any pigment were extruded and laminated as an oxygen permeating layer 1 so that the color concealing layer 12 might come in contact with the oxygen absorbing layer 2, thereby obtaining an oxygen absorbing multi-layer film belt-like roll comprising the uncolored layer 11, the color concealing layer 12, the oxygen absorbing layer 2, the adhesive layer 5 and the gas barrier layer 3.

The appearance of the uncolored layer 11 of this multi-layer film was observed, and as a result, it was apparent that an iron powder in the oxygen absorbing layer was concealed by the color concealing layer 12, and the uncolored layer 11 was white and had the good appearance.

The stick strength of this film from the side of the oxygen permeating layer (in accordance with Ministry of Agriculture, Forestry and Fisheries, Notice 1019), impact strength at 23° C. and 5° C. (in accordance with JIS P8134), and tear strength in directions of MD and TD (in accordance with JIS P8116) were measured. The results are shown in Table 1.

This oxygen absorbing multi-layer film was slit into a width of 20 cm, and the thus obtained packaging material was then folded so that the uncolored layer 11 might become an inner side, and 100 g of a sweet bean jelly bar was filled and packaged thereinto by the vertical pillow packaging machine. While a bag was prepared, the sweet bean jelly bar was filled, the film was sealed up by mutually heat-sealing the uncolored layers to prepare a sweet bean jelly bar package. The operation of the filing and packaging was successful, and workability as the packing material of the oxygen absorbing layer film was excellent.

After this oxygen absorbing multi-layer bag was preserved at 25° C. for 30 days, it was opened, and the color and the taste of the sweet bean jelly bar were evaluated. The preserved sweet bean jelly bar had no bad odor such as oxidative odor, and the color and the taste were well maintained. Furthermore, the inner surface of the bag was observed, and as a result, the rust and the like of the oxygen absorbing layer were concealed and the oxygen absorbing multi-layer bag was white as before the filling. In addition, the heat-sealing strength of the filling mouth of the bag was measured by a push-pull gauge, and as a result, it had a strength of 3.7 kg in a width of 15 mm.

Furthermore, the oxygen absorbing multi-layer bag into which the sweet bean jelly bar was filled was subjected to a drop test from a height of 80 cm in accordance with test procedures of tools, container package, strength and the like in Ministry of Health and Welfare, Notice 3700, No. 3. As a result, sealing properties were not damaged, and any leakage of the contents was not observed.

Comparative Example 1

The same procedure as in Example 1 was conducted except that a metallocene polyethylene containing no pigment (an uncolored layer 11) was replaced with a metallocene polyethylene containing 10% by weight of titanium oxide, to obtain an oxygen absorbing multi-layer film belt-like roll comprising a color concealing layer 12, the color concealing layer 12, an oxygen absorbing layer 2, an adhesive layer 5 and a gas barrier layer 3. Next, tear strength, stick strength and impact strength were measured in the same manner as in Example 1. The results are shown in Table 1.

An oxygen absorbing multi-layer bag was prepared by the same procedure as in Example 1 except that a sweet bean jelly bar was filled by the use of this oxygen absorbing multi-layer film. The thus prepared oxygen absorbing multi-layer bag was subjected to a boil heating sterilization treatment. After the treatment, the appearance of the bag was observed, and as a result, a defect such as leakage was not present in heat-sealed portions, and neither heat shrinkage nor deformation of the bag was confirmed. Furthermore, this oxygen absorbing multi-layer bag was preserved at 25° C. for 30 days, and at this time, a bad odor such as oxidative odor was not confirmed. In addition, the color and the taste of the sweet bean jelly bar were also successfully maintained, and the inner surface of the bag was white as before the filling. However, when the heat-sealing strength of the filling mouth of the prepared bag was measured by a push-pull gauge, it was as low as 1.7 kg in a width of 15 mm. Moreover, when the same drop test as in Example 1 was made, the sealed portions of the bag were peeled off, so that the contents in the bag leaked.

Comparative Example 2

The same procedure as in Example 1 was conducted except that a metallocene polyethylene containing 10% by weight of titanium oxide (a color concealing layer 12) was replaced with a metallocene polyethylene containing no pigment, to obtain an oxygen absorbing multi-layer film belt-like roll comprising an uncolored layer 11, the uncolored layer 11, an oxygen absorbing layer 2, an adhesive layer 5 and a gas barrier layer 3.

An oxygen absorbing multi-layer bag was prepared by the same procedure as in Example 1 except that a sweet bean jelly bar was filled by the use of this oxygen absorbing multi-layer film. The thus prepared oxygen absorbing multi-layer bag was subjected to a boil heating sterilization treatment. After the treatment, the appearance of the bag was observed, and as a result, a defect such as leakage was not present in heat-sealed portions, and neither heat shrinkage nor deformation of the bag was confirmed. Furthermore, this oxygen absorbing multi-layer bag was preserved at 25° C. for 30 days, and at this time, brown stains due to a deoxidizing agent of the oxygen absorbing layer and a bred rust were visually confirmed.

Comparative Example 3

The same procedure as in Example 1 was conducted except that a metallocene polyethylene containing no pigment (an uncolored layer 11) was replaced with a metallocene polyethylene containing 10% by weight of titanium oxide and a metallocene polyethylene containing 10% by weight of titanium oxide (a color concealing layer 12) was replaced with a metallocene polyethylene containing no pigment, to obtain an oxygen absorbing multi-layer film belt-like roll comprising the color concealing layer 12, the uncolored layer 11, an oxygen absorbing layer 2, an adhesive layer 5 and a gas barrier layer 3.

Next, tear strength, stick strength and impact strength were measured in the same manner as in Example 1. The results are shown in Table 1. Afterward, an oxygen absorbing multi-layer bag was prepared by the same procedure as in Example 1 except that a sweet bean jelly bar was filled by the use of this oxygen absorbing multi-layer film. The thus prepared oxygen absorbing multi-layer bag was subjected to a boil heating sterilization treatment. After the treatment, the appearance of the bag was observed, and as a result, a defect such as leakage was not present in heat-sealed portions, and neither heat shrinkage nor deformation of the bag was confirmed. Furthermore, this oxygen absorbing multi-layer bag was preserved at 25° C. for 30 days, and at this time, a bad odor such as oxidative odor was not confirmed. In addition, the color and the taste of the sweet bean jelly bar were also successfully maintained, and the inner surface of the bag was white as before the filling. However, when the heat-sealing strength of the filling mouth of the prepared bag was measured by a push-pull gauge, it was as low as 1.8 kg in a width of 15 mm. Moreover, when the same drop test as in Example 1 was made, the sealed portions were peeled off, so that the contents in the bag leaked.

TABLE 1

|  | Stick Strength | Tear Strength | | Impact Resistance (kg) | |
| --- | --- | --- | --- | --- | --- |
|  |  | MD | TD | 23° C. | 5° C. |
| Example 1 | 820 g | 660 g | 980 g | 19.2 | 17.5 |
| Comp. Ex. 1 | 560 g | 300 g | 480 g | 14.2 | 13.0 |
| Comp. Ex. 3 | 650 g | 530 g | 620 g | 15.1 | 13.5 |

PREPARATION EXAMPLE 2

A metallocene polyethylene having a melt flow rate of 9.0 g/10 min (190° C., 2.16 kgf; JIS K6760) (trade name Affnitypt 1450, made by Dow Chemical Co.) and calcium oxide having an average particle diameter of 20 μm were kneaded in a weight ratio of 59:40:1 by the use of an extruding machine comprising a 45 mmφ one direction rotatable twin-screw extruder equipped with vents and a constant feeder, and the kneaded material was then extruded through a strand die. At this extrusion, a screen of 80 mesh was used in a breaker plate portion. The thus extruded oxygen absorbing resin composition was water-cooled and then ground, thereby obtaining a master batch B.

EXAMPLE 2

By the use of a tandem extrusion laminator having two pairs of extruders comprising a single screw extruder, a T-die and a cooling roll, on one surface of a fed film having a thickness of 30 μm and comprising a straight-chain low-density polyethylene (an adhesive layer 5), a master batch B obtained in Preparation Example 2 was extruded as thick as 60 μm from the first extruder and laminated as an oxygen absorbing layer 2. Next, from the second extruder, a straight-chain low-density polyethylene containing 15% by weight of titanium oxide and having a melt flow rate of 7.0 g/100 min (190° C., 2.16 kgf; JIS K6760) (a color concealing layer 12) was extruded as thick as 25 μm on the oxygen absorbing layer 2, and a uncolored film having a thickness of 30 μm and comprising a straight-chain low-density poly-ethylene containing no pigment (an uncolored layer 11) was unwound out to carry out sandwich lamination.

In consequence, a multi-layer film comprising the uncolored layer 11, the color concealing layer 12, the oxygen absorbing layer 2 and the adhesive layer 5 was obtained. The appearance of the uncolored layer 11 of this multi-layer film was observed, and as a result, it was apparent that an iron powder in the oxygen absorbing layer was concealed by the color concealing layer 12, and the uncolored layer 11 was white and had a good appearance.

On the side of the layer 5 of the obtained multi-layer film, an aluminum foil having a thickness of 9 μm (a gas barrier layer 3) was extruded and laminated via a low-density polyethylene (thickness=15 μm), and a polyethylene terephthalate film having a thickness of 12 μm and a melting point of 255° C. (a protective layer 4) was then dry-laminated to obtain an oxygen absorbing multi-layer film belt-like roll comprising the uncolored layer 11, the color concealing layer 12, the oxygen absorbing layer 2, the adhesive layer 5, the gas barrier layer 3 and the protective layer 4.

This oxygen absorbing multi-layer film was slit into a width of 20 cm, and it was then unwound out by a high-speed automatic filling packaging machine. Afterward, the oxygen absorbing multi-layer film was folded along the center line so that the uncolored layer 11 might be an inner layer, and two sides of the layer were heat-sealed in a length of 10 cm so as to secure a width of 10 cm in a direction vertical to a flow direction, thereby preparing a liquid stock bag comprising the oxygen absorbing multi-layer film. Next, 100 g of a concentrated liquid stock for noodles was filled into the bag, and the filling mouth of the bag was then heat-sealed to prepare a liquid stock bag having three sealed sides. The operation of the filling and packaging was successful, and workability as a packaging material of the oxygen absorbing film was excellent. The thus prepared liquid stock bag was subjected to a boil heating sterilization treatment at 85° C. for 30 minutes. After the treatment, the appearance of the bag was observed, and as a result, a defect such as leakage was not present in the heat-sealed portions, and neither the heat shrinkage of the bag nor deformation was confirmed.

After the preservation of this liquid stock bag subjected to the boil heating sterilization treatment at 25° C. for 30 days, it was opened, and the odor and the taste of the contents were evaluated. For the concentrated liquid stock for noodles filled into the bag comprising the oxygen absorbing multi-layer film, any bad odor such as oxidative odor was not present, and the taste was also successfully maintained. Furthermore, the inner surface of the bag was observed, and as a result, it was confirmed that the rust and the like of the oxygen absorbing layer were concealed and the bag was white as before the filling. In addition, the heat-sealing strength of the filling mouth of the prepared bag was measured by a push-pull gauge, and as a result, it had a strength of 3.7 kg in a width of 15 mm. Moreover, when the same drop test as in Example 1 was made, it was confirmed that the sealed portions were not damaged, so that the contents in the bag did not leak.

EXAMPLE 3

By the use of a tandem extrusion laminator having two pairs of extruders comprising a single screw extruder, a T-die and a cooling roll, a straight-chain low-density polyethylene containing 15% by weight of titanium oxide and having a melt flow rate of 7.0 g/100 min (190° C., 2.16 kgf; JIS K6760) (a color concealing layer 12) was extruded and laminated as thick as 15 μm on one surface of a film having a thickness of 30 μm and comprising an unwound straight-chain low-density polyethylene containing no pigment (uncolored film 11) from the first extruder. Next, from the second extruder, a master batch B obtained in Preparation Example 2 was extruded and laminated as thick as 60 μm as an oxygen absorbing layer 2 on the color concealing layer 12 to obtain a multi-layer film comprising the uncolored layer 11, the color concealing layer 12 and the oxygen absorbing layer 2. The appearance of the uncolored layer 11 of this multi-layer film was observed, and as a result, it was apparent that an iron powder in the oxygen absorbing layer was concealed by the color concealing layer 12, and the uncolored layer 11 was white and had a good appearance.

Subsequently, in the same manner as in Example 2, an oxygen absorbing multi-layer film comprising the uncolored layer 11, the color concealing layer 12, the oxygen absorbing layer 2, an adhesive layer 5, a gas barrier layer 3 and a protective layer 4 was obtained.

Furthermore, a filing packaging of a concentrated liquid stock for noodles bag was prepared in the same manner as in Example 2, and a boil heating sterilization treatment and a preservation test of the liquid stock package were carried out. After a treatment, the appearance of the bag was observed, and as a result, a defect such as leakage was not present in heat-sealed portions, and neither the heat shrinkage of the bag nor the mutual blocking (fusion) of inner surfaces was confirmed. Furthermore, the liquid stock after the preservation for 30 days was free from a bad odor such as an oxidative odor, and the flavor and the taste were successfully maintained.

Furthermore, the inner surface of the bag was observed, and as a result, it was confirmed that rust and the like of the oxygen absorbing layer were concealed and the bag was white as before the filling. In addition, the heat-sealing strength of the filling mouth of the prepared bag was measured by a push-pull gauge, and as a result, it had a strength of 3.8 kg in a width of 15 mm. Moreover, when the same drop test as in Example 1 was made, it was confirmed that the sealed portions were not damaged, so that the contents in the bag did not leak.

EXAMPLE 4

A raw fabric prepared by slitting an oxygen absorbing multi-layer film belt obtained in Example 3 into a width of 25 cm and a barrier packaging material prepared by slitting a transparent barrier packaging material comprising an LLDPE of 40 $\mu$m, an LDPE of 20 $\mu$m and a vinylidene chloride-coated nylon of 20 $\mu$m into a width of 25 cm were used, and three layers were laminated by heat-sealing with a diroll type automatic filling four-sealing machine so that an uncolored layer 11 of the oxygen absorbing multi-layer film might come in contact with the LLDPE of the barrier packaging material at an inner position, thereby preparing a bag of 25×40 cm. At this time, 1 kg of wetted rice was filled into the bag, and a filling mouth was then heat-sealed to prepare a four-sealed oxygen absorbing multi-layer bag having one surface comprising the oxygen absorbing multi-layer film and the other surface comprising the transparent barrier packaging material. It was confirmed that the wetted rice could be filled without impairing the sealing properties of a bag bottom. Since the bag was excellent in hot tack properties, it was also confirmed that at the filling of the wetted rice, a defect such as leakage was not present in heat-sealed portions, and the wetted rice could be filled without any problem.

After this bag was preserved at 25° C. for 30 days, it was opened, and the odor of the wetted rice was evaluated. At this time, it was also confirmed that the wetted rice filled into the oxygen absorbing multi-layer bag had no bad odor such as oxidative odor. Furthermore, the inner surface of the bag was observed, and as a result, rust and the like of the oxygen absorbing layer were concealed and the bag was white as before the filling. In addition, when a heat sealing strength of a filling mouth of the bag was measured by a push pull gauge, it had a strength of 3.8 kg in a width of 15 mm. Moreover, when the same drop test as in Example 1 was made, it was confirmed that the sealed portions were not damaged, so that the contents in the bag did not leak.

PREPARATION EXAMPLE 3

The same procedure as in Preparation Example 2 was conducted except that a metallocene polyethylene used to prepare a master batch in Preparation Example 2 was replaced with a propylene-ethylene block copolymer having a melting point of 161° C., a melt flow rate of 23 g/10 min (230° C., 2.16 kgf; JIS K6758) and a flexural modulus of 980 MPa (JIS K6758), thereby obtaining a master batch C containing a deoxidizing agent and calcium oxide.

EXAMPLE 5

By the use of a tandem extrusion laminator having two pairs of extruders comprising a single screw extruder, a T-die and a cooling roll, on one surface of a fed non-oriented polypropylene film (an uncolored layer 11) having a thickness of 40 $\mu$m and comprising a propylene-ethylene block copolymer having a melting point of 160° C. and a flexural modulus of 910 MPa and containing no pigment, a propylene-ethylene block copolymer containing 15% by weight of titanium oxide and having a melting point of 161° C., a melt flow rate of 23 g/10 min (230° C., 2.16 kgf; JIS K7210) and a flexural modulus of 920 MPa (JIS K6758) was extruded as thick as 20 $\mu$m from the first extruder and laminated (a color concealing layer 12). Next, from the second extruder, the above-mentioned master batch C was extruded as thick as 40 $\mu$m as an oxygen absorbing layer 2 on the color concealing layer 12 to obtain a multi-layer film comprising the uncolored layer 11, the color concealing layer 12 and the oxygen absorbing layer 2. The appearance of the uncolored layer 11 of this multi-layer film was observed, and as a result, it was apparent that an iron powder in the oxygen absorbing layer was concealed by the color concealing layer 12, and the uncolored layer 11 was white and had a good appearance.

On the oxygen absorbing layer 2 of the obtained multi-layer film, an aluminum foil having a thickness of 9 $\mu$m (a gas barrier layer 3) was dry-laminated, and on the aluminum foil, a stretched film comprising nylon 6 and having a thickness of 15 $\mu$m (a protective layer 4) and a polyethylene terephthalate film having a melting point of 255° C. and a thickness of 12 $\mu$m (a protective layer 4) were then dry-laminated. As a result, there was obtained an oxygen absorbing multi-layer film belt-like roll comprising the uncolored layer 11, the color concealing layer 12, the oxygen absorbing layer 2, the gas barrier layer 3, the protective layer 4 and the protective layer 4.

A standing pouch was prepared by folding this oxygen absorbing multi-layer film so that the uncolored layer 11 might be an inner side. In the first place, the oxygen absorbing multi-layer film belt was cut into two films for sides (150 mm×90 mm) and one film for a bottom (55 mm×90 mm), and the film for the bottom was then folded into two portions and its both ends were partially cut out. This partially cut film was interposed between the two films for sides, and both the films were then heat-sealed to join them, thereby obtaining a bag having an opened upper portion (length 150 mm×width 90 mm×bottom width 55 mm). Next, 150 g of meat sauce for spaghetti was filled into this standing pouch, and its opening portion was heat-sealed to seal up the standing pouch. The amount of air in the pouch was about 5 cc.

The sealed standing pouch comprising the oxygen absorbing multi-layer film into which the meat sauce for spaghetti was filled was subjected to a heat sterilization treatment at 135° C. for 8 minutes, and after the treatment, the appearance of the standing pouch was observed. As a result, a defect such as leakage was not present in heat-sealed portions, and neither the heat shrinkage of the bag nor the mutual blocking (fusion) of inner surfaces was confirmed. After this standing pouch comprising the oxygen absorbing multi-layer film was preserved at 25° C. for 30 days, it was opened, and the odor and the taste of the meat sauce for spaghetti were evaluated.

In the meat sauce for spaghetti filled into the standing pouch comprising the oxygen absorbing multi-layer film, a bad odor such as oxidative odor was not present, and its taste was also successively maintained. Furthermore, the inner surface of the bag was observed, and as a result, neither interlaminar delamination of the film nor split of the layers was confirmed. In addition, a heat-sealing strength between the films for sides of the prepared bag was measured by a push-pull gauge, and as a result, it had a strength of 4.5 kg in a width of 15 mm. Moreover, when the same drop test as in Example 1 was made, it was confirmed that the sealed portions were not damaged, so that the contents in the bag did not leak.

EXAMPLE 6

150 g of rice porridge was filled into a standing pouch used in Example 5, and its opening portion was heat-sealed to seal up the standing pouch. The amount of air in the pouch was about 5 cc. The sealed standing pouch into which the rice porridge was filled was subjected to a heat sterilization treatment at 135° C. for 8 minutes, and after the treatment, the appearance of the standing pouch was observed. As a result, a defect such as leakage was not present in heat-sealed portions, and neither the heat shrinkage of the bag nor the mutual blocking (fusion) of inner surfaces was confirmed. After this standing pouch comprising the oxygen absorbing multi-layer film was pre-served at 25° C. for 30 days, it was opened, and the odor and the taste of the rice porridge were evaluated.

In the rice porridge filled into the standing pouch comprising the oxygen absorbing multi-layer film, a bad odor such as oxidative odor was not present, and its taste was also successively maintained. Furthermore, the inner surface of the bag was observed, and as a result, neither interlaminar delamination of the film nor split of the layers was confirmed between layers. In addition, a heat-sealing strength between the films for sides of the prepared bag was measured by a push-pull gauge, and as a result, it had a strength of 4.7 kg in a width of 15 mm. Moreover, when the same drop test as in Example 1 was made, it was confirmed that the sealed portions were not damaged, so that the contents in the bag did not leak.

EXAMPLE 7

By the use of a tandem extrusion laminator having two pairs of extruders comprising a single screw extruder, a T-die and a cooling roll, on one surface of a non-oriented polypropylene film (an adhesive layer 5) having a thickness of 30 μm, a melting point of 160° C. and a flexural modulus of 910 MPa and containing no pigment and comprising a fed propylene-ethylene block copolymer, a master batch C was extruded and laminated as thick as 40 μm as an oxygen absorbing layer 2 from the first extruder. Next, a propylene-ethylene block copolymer containing 15% by weight of titanium oxide and having a melting point of 161° C., a melt flow rate of 23 g/10 min (230° C., 2.16 kgf; JIS K7210) and a flexural modulus of 920 MPa (JIS K6758) and the above-mentioned propylene-ethylene block copolymer containing no titanium oxide were extruded as thick as 20 μm, respectively, so that an uncolored layer 11 might come in contact with a color concealing layer 12 containing titanium oxide and the layer containing no titanium oxide might become a surface layer to obtain a multi-layer film comprising the uncolored layer 11, the color concealing layer 12, the oxygen absorbing layer 2 and the adhesive layer 5. The appearance of the uncolored layer 11 of this multi-layer film was observed, and as a result, it was apparent that an iron powder in the oxygen absorbing layer was concealed by the color concealing layer 12, and the uncolored layer 11 was white and had a good appearance. On the adhesive layer 5 of the obtained multi-layer film, an aluminum foil having a thickness of 9 μm (a gas barrier layer 3) was dry-laminated, and on the aluminum foil, a stretched film comprising nylon 6 and having a thickness of 15 μm (a protective layer 4) and a polyethylene terephthalate film having a melting point of 255° C. and a thickness of 12 μm (a protective layer 4) were then dry-laminated. As a result, there was obtained an oxygen absorbing multi-layer film belt-like roll comprising the uncolored layer 11, the color concealing layer 12, the oxygen absorbing layer 2, the adhesive layer 5, the gas barrier layer 3, the protective layer 4 and the protective layer 4.

Subsequently, the same procedure as in Example 6 was conducted to obtain an oxygen absorbing multi-layer bag. In a rice porridge filled into the standing pouch comprising the oxygen absorbing multi-layer film, a bad odor such as oxidative odor was not present, and its taste was also successively maintained.

In addition, a heat-sealing strength between films for sides of the prepared bag was measured by a push-pull gauge, and as a result, it had a strength of 4.5 kg in a width of 15 mm. Moreover, when the same drop test as in Example 1 was made, it was confirmed that the sealed portions were not damaged, so that the contents in the bag did not leak.

EXAMPLE 8

A two-kind three-layer film comprising an uncolored layer 11, a color concealing layer 12 and a resin layer 13 and having a total thickness of 50 μm was prepared by co-extrusion in which two outer layers were made of a propylene-ethylene block copolymer containing no pigment and having a thickness of 15 μm, a melting point of 162° C. and a flexural modulus of 920 MPa and an intermediate layer was made of a propylene-ethylene block copolymer containing 15% by weight of titanium oxide and having a thickness of 20 μm.

By the use of an extrusion laminator comprising a single screw extruder, a T-die and a cooling roll, a master batch C prepared in Preparation Example 3 was extruded to laminate an oxygen absorbing layer 2 having a thickness of 50 μm on the above-mentioned fed two-kind three-layer film so that the oxygen absorbing layer 2 might come in contact with a cooling mirror roll, thereby obtaining a multi-layer film comprising the uncolored layer 11, the color concealing layer 12, the resin layer 13 and the oxygen absorbing layer 2. When the surface appearance of the oxygen absorbing layer 2 was observed, it was confirmed that the surface was smoothed. There was obtained the oxygen absorbing multi-layer film comprising the uncolored layer 11, the colored layer 12, the resin layer 13, the oxygen absorbing layer 2 and the gas barrier layer 3 by dry laminating an aluminum foil having a thickness of 9 μm (a gas barrier layer 3) on the resultant oxygen absorbing layer 2 in the multi-layer film.

Then, a package of a meat sauce for spaghetti was prepared and subjected to heating sterilizing treatment and preservation test in the same manner as in Example 5.

In a meat sauce for spaghetti filled into the standing pouch comprising the oxygen absorbing multi-layer film, a bad odor such as oxidative odor was not present, and its taste was also successively maintained. Furthermore, the inner surface of the bag was observed, and as a result, neither ply separation of the film nor split of the layers was confirmed.

In addition, a heat-sealing strength between the films for sides of the prepared bag was measured by a push-pull gauge, and as a result, it had a strength of 4.5 kg in a width of 15 mm. Moreover, when the same drop test as in Example 1 was made, it was confirmed that the sealed portions were not damaged, so that the contents in the bag did not leak.

As is apparent from the above-mentioned results, in Comparative Example 1 in which an uncolored layer 11 is not present on a film surface and Comparative Example 3 in which the uncolored layer 11 and a color concealing layer 12 are inversely arranged, heat-sealing strengths are as low as 1.7 kg and 1.8 kg, respectively. Furthermore, in Comparative Example 2 in which the color concealing layer 12 is not present, brown stains due to a deoxidizing agent of an oxygen absorbing layer and a bred rust are visually confirmed, and the visual appearance is poor. On the contrary, the oxygen absorbing multi-layer films of the present invention are excellent in appearance, stick strength, tear strength and impact strength, and all of them have heat-sealing strengths as high as 3.7 kg or more, and they were excellent in various physical properties as the packaging material. The oxygen absorbing packaging containers of the present invention are excellent in hot tack properties and the flavor holding properties of the contents therein, and they have such an excellent heat resistance and sealing properties that they can withstand a high-temperature heat sterilization treatment such as a boil treatment, a retort treatment and a high retort treatment.

The oxygen absorbing multi-layer film of the present invention is excellent in appearance, heat resistance, impact strength, tear strength and stick strength, and when the oxygen absorbing multi-layer film is molded, a packaging container having excellent oxygen absorbing performances can be obtained. In addition, the packaging container is excellent in heat-sealing properties and hot tack properties, so that a material such as a food to be preserved can be filled and packaged by a high-speed automatic filling. Moreover, by molding the oxygen absorbing multi-layer film of the present invention, it is possible to obtain a packaging container having excellent heat resistance which does not bring about bag breakage, heat shrinkage, ply separation and the mutual blocking (fusion) of inner surfaces in the case that a high-temperature heat sterilization treatment is carried out.

What is claimed is:

1. An oxygen absorbing multi-layer film which comprises:
    a first outer surface comprising an uncolored oxygen permeating layer 11 comprising an oxygen permeating polyolefin which does not contain a pigment;
    a colored concealing, oxygen permeating layer 12 disposed under the uncolored oxygen permeating layer 11, said color concealing, oxygen permeating layer 11 comprising an oxygen permeating polyolefin and a pigment;
    a second outer surface disposed opposite to said first outer surface, said second outer surface comprising a gas barrier layer 3; and
    an oxygen absorbing layer 2 disposed between the colored concealing, oxygen permeating layer 12 and the gas barrier layer 3, said oxygen absorbing layer 2 being made of an oxygen absorbing resin composition comprising an iron-containing deoxidizing agent and an oxygen permeating polyolefin.

2. The oxygen absorbing multi-layer film according to claim 1 wherein each of the uncolored oxygen permeating layer 11 and the colored concealing, oxygen permeating layer 12 have a thickness of 10 to 100 μm.

3. The oxygen absorbing multi-layer film according to claim 1 wherein a resin layer 13 which comprises an oxygen permeating olefin is laminated between the colored concealing, oxygen permeating layer 12 and the oxygen absorbing layer 2.

4. The oxygen absorbing multi-layer film according to claim 1 wherein a protective layer 4 comprising a thermoplastic resin is laminated as a surface layer on the gas barrier layer 3.

5. The oxygen absorbing multi-layer film according to claim 1 wherein an adhesive layer 5 comprising at least one material selected from the group consisting of an adhesive and an adhesive resin is laminated between the oxygen absorbing layer 2 and the gas barrier layer 3.

6. The oxygen absorbing multi-layer film according to claim 1 wherein the oxygen absorbing resin composition of the oxygen absorbing layer 2 is obtained by adding the iron-containing deoxidizing agent and an alkaline earth metal oxide to the oxygen permeating polyolefin.

7. The oxygen absorbing multi-layer film according to claim 6 wherein 2 to 93% by weight of the iron-containing deoxidizing agent and 0.1 to 5% by weight of the alkaline earth metal oxide are contained in the oxygen absorbing resin composition.

8. The oxygen absorbing multi-layer film according to claim 4 wherein the oxygen permeating polyolefin of each of the uncolored oxygen permeating layer 11, the colored concealing, oxygen permeating layer 12 and the oxygen absorbing layer 2 has a melting point of 135° C. or more, and the thermoplastic resin of the protective layer 4 has a melting point which is 10° C. or higher than the melting point of the polyolefin of the uncolored oxygen permeating layer 11.

9. The oxygen absorbing multi-layer film according to claim 1 wherein the oxygen permeating polyolefin of each of the uncolored oxygen permeating layer 11, the colored concealing, oxygen permeating layer 12 and the oxygen absorbing layer 2 has a flexural moduli as measured in accordance with JIS K6758 of 1300 MPa or less.

10. The oxygen absorbing multi-layer film according to claim 4 wherein the protective layer 4 comprises at least one layer selected from the group consisting of a polyamide protective layer and a polyethylene terephthalate protective layer.

11. A packaging container which comprises the oxygen absorbing multi-layer film of claim 1 at as at least a part of an inner wall surface of the container so that the uncolored oxygen permeating layer 11 is exposed to an interior of the container.

12. A packaging container which comprises the oxygen absorbing multi-layer film of claim 2 as at least a part of an inner wall surface of the container so that the uncolored oxygen permeating layer 11 is exposed to an interior of the container.

13. A packaging container which comprises the oxygen absorbing multi-layer film of claim 3 as at least a part of an inner wall surface of the container so that the uncolored oxygen permeating layer 11 is exposed to an interior of the container.

14. A packaging container which comprises the oxygen absorbing multi-layer film of claim 4 as at least a part of an inner wall surface of the container so that the uncolored oxygen permeating layer 11 is exposed to an interior of the container.

15. A packaging container which comprises the oxygen absorbing multi-layer film of claim 5 as at least a part of an inner wall surface of the container so that the uncolored oxygen permeating layer 11 is exposed to an interior of the container.

16. A packaging container which comprises the oxygen absorbing multi-layer film of claim 6 as at least a part of an inner wall surface of the container so that the uncolored oxygen permeating layer 11 is exposed to an interior of the container.

17. A packaging container which comprises the oxygen absorbing multi-layer film of claim 7 as at least a part of an inner wall surface of the container so that the uncolored oxygen permeating layer 11 is exposed to an interior of the container.

18. A packaging container which comprises the oxygen absorbing multi-layer film of claim 8 as at least a part of an inner wall surface of the container so that the uncolored oxygen permeating layer 11 is exposed to an interior of the container.

19. A packaging container which comprises the oxygen absorbing multi-layer film of claim 9 as at least a part of an inner wall surface of the container so that the uncolored oxygen permeating layer 11 is exposed to an interior of the container.

20. A packaging container which comprises the oxygen absorbing multi-layer film of claim 10 as at least a part of an inner wall surface of the container so that the uncolored oxygen permeating layer 11 is exposed to an interior of the container.

21. An oxygen absorbing multi-layer film which comprises:

an oxygen permeating layer 1 comprising an uncolored oxygen permeating layer 11 comprising an oxygen permeating polyolefin which does not contain a pigment, and a colored concealing, oxygen permeating layer 12 disposed under the uncolored oxygen permeating layer 11, said color concealing, oxygen permeating layer 12 comprising an oxygen permeating polyolefin and a pigment;

a gas barrier layer 3 having an oxygen permeability of less than 100 cc/m$^2$·day·atm at 23° C. and a RH of 100%; and an oxygen absorbing layer 2 disposed between the colored concealing, oxygen permeating layer 12 of the oxygen permeating layer 1 and the gas barrier layer 3, said oxygen absorbing layer 2 comprising an iron-containing deoxidizing agent and an oxygen permeating polyolefin.

22. The oxygen absorbing multi-layer film according to claim 11 wherein the uncolored oxygen permeating layer 11 has a thickness of 20 to 80 $\mu$m and the colored concealing, oxygen permeating layer 12 has a thickness of 20 to 80 $\mu$m.

23. The oxygen absorbing multi-layer film according to claim 11 further comprising a resin layer 13 which comprises an oxygen permeating olefin which does not contain a pigment, the resin layer 13 being laminated between the colored concealing, oxygen permeating layer 12 and the oxygen absorbing layer 2.

* * * * *